Figure 1:
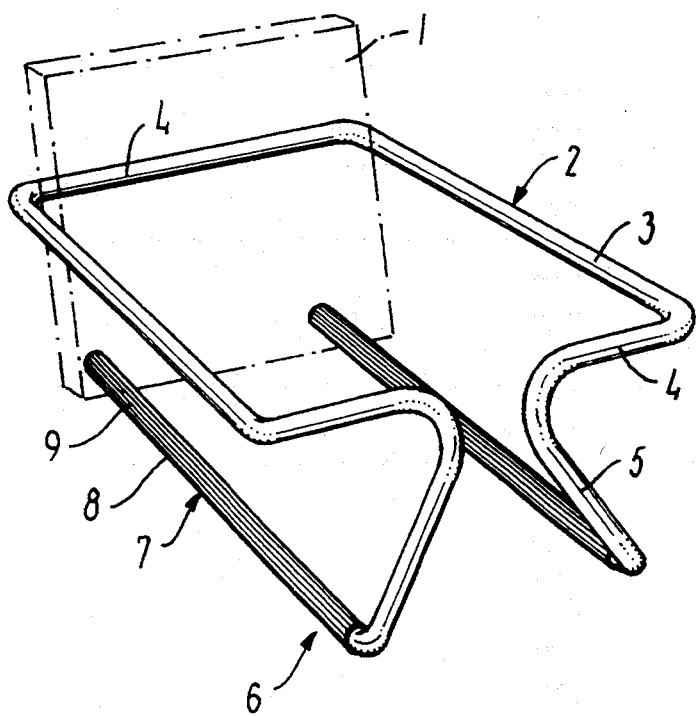

United States Patent [19]

Larsen

[11] Patent Number: 5,437,376

[45] Date of Patent: Aug. 1, 1995

[54] HOLDER FOR FLAT ARTICLES, SUCH AS CD CASSETTES, CD-ROM CASSETTES, PROGRAM DISKETTES AND THE LIKE

[75] Inventor: Tommy Larsen, Them, Denmark

[73] Assignee: Tommy Larsen ApS, Them, Denmark

[21] Appl. No.: 174,930

[22] Filed: Dec. 29, 1993

[30] Foreign Application Priority Data

Feb. 12, 1993 [DK] Denmark ............................... 157/93
Apr. 2, 1993 [DE] Germany ........................ 9305038 U
Dec. 23, 1993 [DK] Denmark ............................ 9300558

[51] Int. Cl.6 ............................................. A47F 5/00
[52] U.S. Cl. ..................................... 211/40; 211/43; 312/9.9; 206/309
[58] Field of Search ....................... 211/41, 43, 40, 42, 211/181, 50, 10; 312/9.9; 206/309

[56] References Cited

U.S. PATENT DOCUMENTS

| | | | |
|---|---|---|---|
| 1,750,576 | 3/1930 | Cubberley | 211/43 X |
| 2,901,119 | 8/1959 | Almer | 211/195 X |
| 2,917,179 | 12/1959 | Casey et al. | 211/40 |
| 3,114,459 | 12/1963 | Kersting | 211/40 |
| 3,200,959 | 8/1965 | Theim | 211/50 |
| 3,307,708 | 3/1967 | Halstead | 211/40 |
| 4,238,035 | 12/1980 | Kassanchuk | 211/181 X |
| 4,748,993 | 6/1988 | Llewellyn | 211/181 X |
| 5,035,332 | 7/1991 | Stravitz | 211/40 |
| 5,054,626 | 10/1991 | Stempinski | 211/40 |
| 5,103,987 | 4/1992 | Davis | 211/43 |
| 5,117,984 | 6/1992 | Kennedy | 211/40 X |

FOREIGN PATENT DOCUMENTS

4028196 3/1992 Germany.

*Primary Examiner*—Robert W. Gibson, Jr.
*Attorney, Agent, or Firm*—Jacobson, Price, Holman & Stern

[57] ABSTRACT

A holder for flat articles (1) in the form of CD cassettes, CD-ROM cassettes, diskettes and the like comprises a base part (6) to support the articles (1) placed in the holder, and a frame part (2) arranged above and at a distance from the base part (6) and provided with two longitudinal side members (3). The holder moreover comprises end members (4) serving as rest means for the articles (1) arranged in the holder, and includes at least one connecting member (5) connecting the frame part with the base part. The base part (6) is formed with an essentially plane support face for the articles (1) and with means (8) to prevent the supported articles from sliding on the support face of the base part.

11 Claims, 2 Drawing Sheets

HOLDER FOR FLAT ARTICLES, SUCH AS CD CASSETTES, CD-ROM CASSETTES, PROGRAM DISKETTES AND THE LIKE

The invention concerns a holder for flat articles and of the type permitting direct inspection of the articles for selection, which requires that the user can view the information on one of the flat sides of the articles and that he can easily gain access to the front and/or rear side of the article.

The primary use of the invention will be as a holder for articles containing stored information, including in particular for CD cassettes, CD-ROM cassettes, program diskettes and the like.

In this market there are numerous different types of holders, but these known devices are vitiated by various drawbacks. Some of these known holders are compartmentalized for a specific type of articles, and in connection with e.g. CD cassettes the thickness of these articles varies depending upon whether they are ordinary CD cassettes, double CD's or maxi-singles. Further, this type of holders is often provided with pivotable gripper rails for the articles, and these rails, which are usually of plastics, tend to break in the areas around the gripper rail pivots engaged with the holder frame, which is inconvenient to the user. In addition, the compartmentalized holders are difficult to clean, because they are not easy to dust.

All things considered, it may be said that there is a great market for holders for CD cassettes, CD-ROM cassettes and similar articles, where the holder is to be capable of containing the various types of articles irrespective of their individual thicknesses. The holder must be capable of being cleaned in a simple manner, and it must be easy to get a survey of the contents of the holder.

The invention provides a holder for flat articles, and this holder comprises a base part and a frame part. The articles are supported by the base part on one of their narrow sides and are kept together as a stack in that the outermost article or articles in the stack rest against the end member or members of the frame part. The stack is kept together by means of the side members of the frame part which restrict the movement of the articles transversely to the stacking direction. The base member is provided with means to prevent the articles from slipping on the base, even if they are arranged obliquely in the holder.

Since the base member is plane, the articles can be arranged arbitrarily in the holder, because no discrete seats for the articles have been reserved beforehand. Thus, articles of any thickness can be placed in the holder. The anti-slip means of the base member ensure that the articles stand in a stable manner in the holder, even though this is not provided with discrete grooves or holding means for the articles. Further, the distance between the base member and the frame part together with the constructive feature that the base part constitutes an essentially plane support face for the articles, ensures that the holder is easy to clean, which normally means easy to dust.

The latter circumstance is extremely important, because the holder of the type according to the invention can be considered an object of applied art, and e.g. the CD holder will be exposed to free view in the home close to stereo set. The holder therefore tends to collect dust, but the holder of the invention will be easy to wipe off, because it has no corners or holding grooves which are hard to get at.

In a preferred embodiment the base member comprises two wire members of strong metal wire, and these wires may advantageously be coated with a tight rubber hose, which may e.g. be shrinked on to the wires or stretched prior to mounting.

The frame member, too, may advantageously be formed as bent metal wires to provide a rectangular wire frame within which articles are provided. The wire frame may advantageously be bent so that also the wires constitute the end member which connects the base part with the frame part. In this case, too, the wire members of the base part may advantageously be coated with a hollow rubber hose. According to a preferred embodiment the wire members of the base part are arranged in parallel, and they extend at a distance from each other which is as great as possible, because the articles will then stand in a stable manner without any risk of turning over.

Finally, the invention also concerns a hollow, tight rubber hose as a coating on the tube members of a base part on a holder for flat articles, said rubber hose counteracting slipping of the articles on tube members of the base part, while ensuring that the holder stands firmly on the base.

Figure 2:
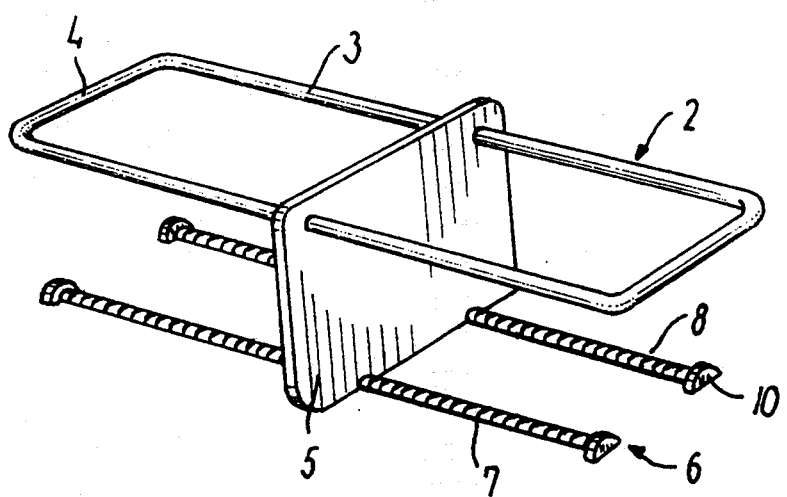
Figure 3:
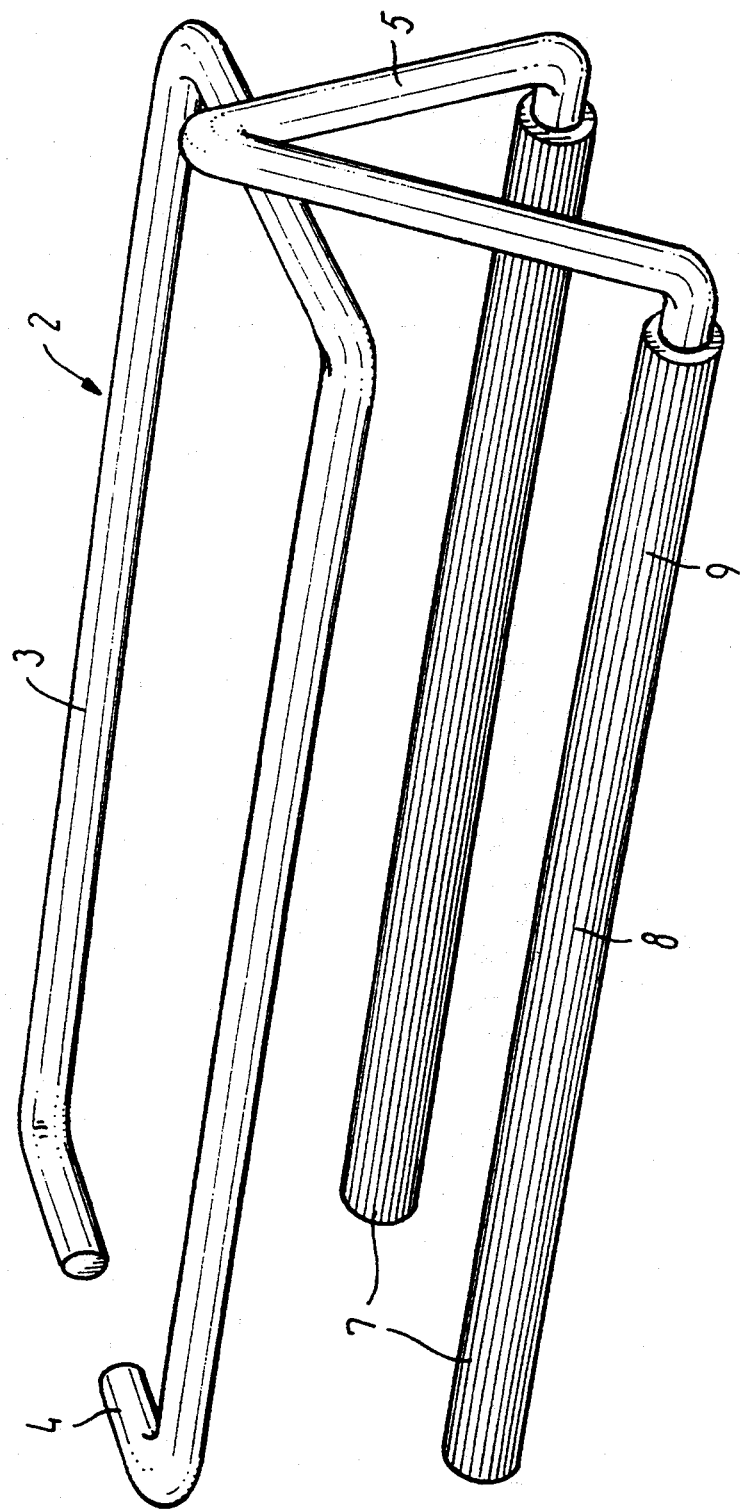

The invention will be explained more fully below in connection with preferred embodiments and with reference to the drawing, in which FIG. 1 is a perspective view of a preferred embodiment of a holder according to the invention for the storage of CD cassettes;

FIG. 2 is a perspective view of an alternative embodiment of a holder according to the invention; and FIG. 3 is a perspective view of a further possible embodiment of a holder according to the invention.

The figures show preferred embodiments of a holder according to the invention for flat articles 1 in the form of CD cassettes, CD-ROM cassettes, storage diskettes for electronic data processing as well as other similar articles. The holder comprises a base part 6 to support articles 1 placed in it. A frame part 2 is mounted above and at a distance from the base part 6, and it is formed with two longitudinal side members 3. In addition the holder comprises end members 4 serving as rest means for the articles 1 placed in the holder, as well as at least one connecting part 5 which connects the frame part 2 with the base part 6. The base part 6 is formed with an essentially plane support face for the articles 1 and with means 8 to ensure that the supported articles do not slide or skid on the support face of the base member.

FIG. 1 shows a preferred embodiment of the holder, and the frame part 2 is here in the form of a rectangular frame made of bent metal wire. The frame part 2 has two longitudinal side members 3 and end members 4, one of said end members 4 serving as a connecting part or connecting member 5, the wires being here bent downwards so that the wire ends constitute the base member 6 in the form of two longitudinal wire members 7 formed with anti-slip means 8 here in the form of two rubber hoses 9.

In the preferred embodiment the frame part 2 has a width which is slightly greater than the height of a standard CD cassette, enabling the cassettes to be stacked upright so that their title side is turned up toward the user. The length of the holder is adapted to the number of cassettes which the holder is to be capable of accommodating, here e.g. 20, 25 or 40. The distance between the frame part 2 of the holder and the base part 6 is selected such that the articles 1 are supported by the end members 4 in the area around the centre of gravity of the articles. The best "page turning" effect for the cassettes is obtained when the support takes place in the area around the central third of the article. In the preferred embodiment the holder is made by bending a long, continuous metal wire having a diameter of about 7 mm. The wall thickness of the rubber hose 9 is here selected to be of the order of 1½ to 2 mm. Other dimensions can be used and depend on the types of flat articles for which the holder is contemplated.

The hose member 9 is placed on the wire end 7 by being dilated or expanded prior to mounting. In the preferred embodiment the hose member 9 is made of a synthetic rubber material, and ensures that the cassettes stand in a stable manner in the holder, and that the holder stands in a stable manner on the base. Alternatively, the hose member 9 may be shrinked on to the wire members 7.

FIG. 2 shows an alternative embodiment of the invention, and it will be seen that the frame part 2 or the rectangular frame has two longitudinal side members 3 which are interconnected at the ends by end members 4. In addition, the holder is centrally provided with a connecting part 5, which is plate-shaped and may e.g. be made of a rigid plastics material, such as thermoplastics. Here the base member 6 consists of two longitudinal wire members 7 which are provided with grooves in the transverse direction of the holder serving as anti-slip means 8. These transverse grooves have a small depth in the wire members 7 and a great density, thereby ensuring that the flat articles 1 (not shown) placed in the holder cannot skid, without discrete seats having been allocated to them beforehand in the holder. The frame part 2 can be made as two U-shaped profiles which are assembled by soldering in the area around the plate-shaped connecting part 5. Here the base part 6 consists of two surface ground wire members 7 which are formed with semi-circular stops 10 at the ends.

FIG. 3 shows a further alternative way of designing the holder according to the invention, said holder being here formed by two wire members, one of which is bent as a frame part 2 having longitudinal sides 3 and end members 4 against which the flat articles (not shown) rest when placed in the holder. Here the base part 6 consists of two longitudinal wire members 7 coated with anti-slip means 8 in the form of hose members 9. The base part 6 is connected with the frame part 2 by a V-shaped connecting part 5. The frame part 2 is welded or soldered on the connecting part 5 through two welds in the vicinity of the tip of the connecting part 5.

I claim:

1. A holder for flat articles in the form of CD cassettes, CD-ROM cassettes, diskettes and the like, comprising:
   a base part to support the articles placed in the holder; and
   a frame part arranged above and at a distance from the base part and provided with two longitudinal side members, wherein said articles are to be placed as a stack between said two longitudinal side members;
   said holder moreover comprising end members serving as rest means for the articles placed in the holder, and comprising at least one connecting member connecting the frame part with the base part;
   said base part being provided with an essentially plane support face for the articles and with anti-slip means to prevent the supported articles from sliding on the support face of the base part.

2. A holder according to claim 1, wherein the side members of the frame part are located in parallel with a mutual spacing which is slightly greater than the selected dimension of the articles.

3. A holder according to claim 1, wherein the distance from the base part to the frame part is selected such that the end members support the articles immediately below their center of gravity.

4. A holder for flat articles in the form of CD cassettes, CD-ROM cassettes, diskettes and the like, comprising:
   a base part to support the articles placed in the holder; and
   a frame part arranged above and at a distance from the base part and provided with two longitudinal side members, wherein said articles are to be placed as a stack between said side members;
   said holder moreover comprising end members serving as rest means for the articles placed in the holder, and comprising at least one connecting member connecting the frame part with the base part;
   said base part being provided with an essentially plane support face for the articles and with anti-slip means to prevent the supported articles from sliding on the support face of the base part, said base part further comprising two wire members of metal extending in parallel with the side members of the frame part.

5. A holder according to claim 4, wherein the wire members of the base part are located in the immediate vicinity of and within vertical planes with the side members of the frame part as generatrices.

6. A holder according to claim 4, wherein the wire members of the base part are coated with a rubber hose which extends along substantially the entire length of said wire members.

7. A holder for flat articles in the form of CD cassettes, CD-ROM cassettes, diskettes and the like, comprising:
   a base part to support the articles placed in the holder; and
   a frame part arranged above and at a distance from the base part and provided with two longitudinal side members, wherein said articles are to be placed as a stack between said two longitudinal side members;
   said holder moreover comprising end members serving as rest means for the articles placed in the holder, and comprising at least one connecting member connecting the frame part with the base part;
   said base part being provided with an essentially plane support face for the articles and with anti-slip means to prevent the supported articles from sliding on the support face of the base part;
   wherein the frame part is made by bending a metal wire such that it constitutes a rectangular holder frame.

8. A holder according to claim 7, wherein the metal wire of the frame part is bent so as to constitute the end members connected with the base part by one end of the frame part, and terminates as two parallel wire members of metal coated with rubber.

9. A holder according to claim 7, wherein the side members of the frame part are located in parallel with a mutual spacing which is slightly greater than the selected dimension of the articles.

10. A holder according to claim 7, wherein the base part comprises two wire members of metal extending in parallel with the side members of the frame part, and wherein the wire members of the base part are located in the immediate vicinity of and within vertical planes with the side members of the frame part as generatrices.

11. A holder according to claim 7, wherein the distance from the base part to the frame part is selected such that the end members support the articles immediately below their center of gravity.

* * * * *

UNITED STATES PATENT AND TRADEMARK OFFICE
Certificate

Patent No. 5,437,376

Patented: August 1, 1995

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Tommy Larsen, Henrik Peter Holbaek and Claus Jenson.

Signed and Sealed this Eighteenth Day of July, 2000.

LESLIE A. BRAUN, SPE
Art Unit 3632

UNITED STATES PATENT AND TRADEMARK OFFICE
Certificate

Patent No. 5,437,376                                                              Patented: August 1, 1995

On petition requesting issuance of a certificate for correction of inventorship pursuant to 35 U.S.C. 256, it has been found that the above-identified patent, through error and without deceptive intent, improperly sets forth the inventorship.

Accordingly, it is hereby certified that the correct inventorship of this patent is: Tommy Larsen, Henrik Peter Holbaek and Claus Jensen.

Signed and Sealed this Nineteenth Day of September, 2000.

*LESLIE A. BRAUN*
*Supervisory Patent Examiner*
*Art Unit 3632*